US005156645A

United States Patent [19]

Tsukamoto et al.

[11] Patent Number: 5,156,645

[45] Date of Patent: Oct. 20, 1992

[54] WORKING FLUID CIRCUIT FOR ACTIVE SUSPENSION SYSTEM WITH SURGE SUPPRESSION DURING FAIL-SAFE MODE OPERATION

[75] Inventors: Masahiro Tsukamoto, Kanagawa; Hideki Tsuchiya, Gifu, both of Japan

[73] Assignee: Nisson Motor Company, Limited, Tokyo, Japan

[21] Appl. No.: 514,038

[22] Filed: Apr. 27, 1990

[30] Foreign Application Priority Data

Apr. 27, 1989 [JP] Japan ................................ 1-108396

[51] Int. Cl.[5] ........................ B60G 17/00; B60G 21/06

[52] U.S. Cl. ........................................ 280/714; 60/468

[58] Field of Search .................... 280/707, 714, 840, 6, 280/12; 60/468

[56] References Cited

U.S. PATENT DOCUMENTS

| | | | |
|---|---|---|---|
| 3,572,212 | 3/1971 | Pigisch | 60/468 |
| 4,010,610 | 3/1977 | Dunn | 60/468 |
| 4,702,490 | 10/1987 | Yamaguchi et al. | 280/707 |
| 4,765,649 | 8/1988 | Ikemoto | 280/707 |
| 4,799,707 | 1/1989 | Buma et al. | 280/714 |
| 4,801,115 | 1/1989 | Heard | 248/219.3 |
| 4,848,790 | 7/1989 | Fukunaga et al. | 280/707 |
| 4,865,348 | 9/1989 | Hano et al. | 280/707 |
| 4,888,696 | 12/1989 | Akatsu et al. | 364/424.05 |
| 4,903,983 | 2/1990 | Fukushima et al. | 280/707 |
| 4,905,152 | 2/1990 | Kawabata | 364/424.05 |
| 4,909,534 | 3/1990 | Fukushima et al. | 280/707 |
| 4,911,468 | 3/1990 | Fukunaga | 280/707 |
| 4,911,469 | 3/1990 | Kawarasaki | 280/707 |
| 4,911,470 | 3/1990 | Fukunaga | 280/707 |
| 4,919,440 | 4/1990 | Tsukamoto | 280/707 |
| 4,938,499 | 7/1990 | Kawabata | 280/707 |
| 4,943,084 | 7/1990 | Fukunaga et al. | 280/707 |
| 4,948,165 | 8/1990 | Takahashi et al. | 280/707 |
| 4,961,595 | 10/1990 | Fukushima et al. | 280/772 |
| 4,967,360 | 10/1990 | Fukunaga et al. | 364/424.05 |

FOREIGN PATENT DOCUMENTS

| | | |
|---|---|---|
| 0283004 | 9/1988 | European Pat. Off. . |
| 0284053 | 9/1988 | European Pat. Off. . |
| 0285153 | 10/1988 | European Pat. Off. . |
| 0318721 | 6/1989 | European Pat. Off. . |
| 0318932 | 6/1989 | European Pat. Off. . |
| 0345815 | 12/1989 | European Pat. Off. . |
| 0345817 | 12/1989 | European Pat. Off. . |
| 3902312 | 8/1989 | Fed. Rep. of Germany . |
| 3904922 | 9/1989 | Fed. Rep. of Germany . |

*Primary Examiner*—Krain L. Tyson
*Attorney, Agent, or Firm*—Foley & Lardner

[57] ABSTRACT

An active suspension system is provided with a pressure accumulator connected to a drain line connecting a drain port of a pressure control valve which controls pressure in the working chamber of an active cylinder. The pressure accumulator serves to absorb high pressure surge. A surge pressure absorbing unit is provided for feeding back the surge pressure generated in the drain line to the pressure accumulator via a supply line so that the surge pressure can be successfully absorbed by the pressure accumulator.

5 Claims, 7 Drawing Sheets

WORKING FLUID CIRCUIT FOR ACTIVE SUSPENSION SYSTEM WITH SURGE SUPPRESSION DURING FAIL-SAFE MODE OPERATION

BACKGROUND OF THE INVENTION

1. Field of the Invention

The present invention relates to an active suspension system for an automotive vehicle. More specifically, the invention relates to a fluid circuit for supplying and draining a working medium fluid through the active suspension system.

2. Description of the Background Art

U.S. Pat. No. 4,702,490, issued on Oct. 27, 1987 which has been assigned to the common owner of the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder communicates with a hydraulic circuit including a pressurized working fluid source. A pressure control valve, such as a proportioning valve assembly, is disposed in the hydraulic circuit, which is connected to an electric or electronic control circuit to be control the valve position. The pressure control valve position is controlled by a suspension control signal produced in the control circuit for adjusting pressure in the working chamber and thereby controlling suspension characteristics.

On the other hand, European Patents 0 283 004, 0 285 153 and 0 284 053 disclose technologies for controlling suspension systems constructed as set forth above, depending upon the vehicle driving condition for suppressing rolling and/or pitching of the vehicular body.

One typical construction of the hydraulic circuit includes a pressure source unit which comprises a fluid pump drivingly associated with an automotive internal combustion engine so as to be driven by the engine output torque. The fluid pump is generally rated to produce rated pressure which is selected in view of the required line pressure in a supply line for supplying the pressurized fluid to the working chamber, at the minimum revolution speed of the engine so that the working fluid pressure to be supplied to the working chamber of the hydraulic cylinder can be satisfactorily high at any engine driving range. As will be appreciated, the output pressure of the fluid pump increases according increasing engine revolution speed. Therefore, at a high engine revolution speed range, excessive pressure in excess of a predetermined maximum line pressure is relieved via a relief valve. Therefore, the engine output can be wasted to degrade engine driving performance as a power plant for the automotive vehicle and thus degrade fuel economy.

On the other hand, in the practical operation of active suspension system, the fluid pressure in the working chamber in the hydraulic cylinder can be maintained at a constant value for maintaining a desired vehicular height, at substantially low vehicle speed range or while the vehicle is not running. Despite this fact, the prior proposed hydraulic circuits for actively controlled suspension systems supply the rated pressure of the fluid pump which should be higher than a minimum line pressure required for adjustment of the fluid pressure in the working chamber. In order to maintain the rated pressure output from the fluid pump, substantial engine output will be consumed even at a low vehicle speed range, in which line pressure is not required there being no possibility that adjustment of the suspension characteristics would be necessary.

Improvement in the hydraulic circuit for the prior proposed active suspension system has been proposed in co-pending U.S. patent application Ser. No. 331,602, filed on Mar. 31, 1989, which application has been commonly assigned to the common assignee to the present invention now U.S. Pat. No. 4,911,468. The corresponding invention to that the in above-identified co-pending U.S. Patent Application has been published as Japanese Patent First (unexamined) Publication (Tokkai) Heisei 1-249509, published on Oct. 4, 1989. The prior invention is directed to a hydraulic circuit for an actively controlled suspension system which employs first and second pressure relief valves disposed in a hydraulic pressure source circuit for relieving excessive pressure. The second pressure relief valve for a lower relief pressure than that of the first pressure relief valve. Means for selectively connecting and disconnecting the second pressure relief valve is disposed in the hydraulic pressure source circuit at a position upstream of the second pressure relief valve. This means is positioned in shut-off position to disconnect the second pressure relief valve when vehicle traveling speed is higher than a predetermined speed. This means is responsive to a vehicle speed lower than the predetermined speed for establishing a connection between a pressurized fluid source to the second relief valve for relieving the pressure at a lower level than that established when the vehicle speed is higher than the predetermined speed.

Furthermore, the prior proposed invention includes a pilot pressure operated operational one-way check valve in a drain line for regulating line pressure to be supplied to a pressure control valve which adjusts fluid pressure in a working chamber in a hydraulic cylinder disposed between a vehicle body and a suspension member rotatably supporting a road wheel, by draining excessive line pressure. Similar hydraulic circuit arrangements have also been disclosed in European Patent First Publications Nos. 0 318 721, 0 318 932, for example.

Such a prior proposed hydraulic circuit does provide improved characteristics for the active suspension system in certain aspect. However, the prior proposed system still encounters a drawback in the response characteristics of the pressure control valve unit due the presence of back pressure due to flow resistance in the drain line.

For preventing this, U.S. Pat. application Ser. No. 454,785, filed on Dec. 26, 1989, now U.S. Pat. No. 4,982,979 issued on Jan. 8, 1991, discloses a hydraulic circuit construction which can absorb back pressure in a drain line. This hydraulic circuit for an active suspension system employs a pressure accumulator connected to a drain line at a position upstream of a pilot operated operational one-way check valve. The pressure accumulator absorbs back pressure generated in the drain line due to flow resistance in the drain line. Such a hydraulic circuit construction is effective for avoiding the influence of back pressure induced in the drain line and thus enhances drain characteristics for providing better response characteristics in the active suspension system.

In such a prior proposed system, the pressure accumulator disposed in the drain line is set at a gas pressure slightly lower than the possible minimum pressure of the working fluid pressure in the hydraulic circuit. In practice, the gas pressure is set at 80 to 90% of the possible minimum hydraulic pressure so that pressure transfer medium, such as piston, diaphragm or so forth, would not be damged by collision with the inner periphery of the accumulator housing even at the minimum fluid pressure in the drain line. As can be appreciated, in view of practical installation on the vehicular body, the drain line piping is inevitably long and has a small path area to serve as resistance against the fluid flow through the drain line. Therefore, when valve position in the pressure control valve is abruptly changed to a cause substantial reduction of the fluid flowing into the drain line, the fluid pressure in the drain line can be lowered to a level lower than the gas pressure. In such case, the pressure accumulator becomes ineffective for absorbing surge pressure in the drain line. Therefore, the surge pressure may affect the control pressure supplied to the working chamber of active cylinder to cause degradation of the riding comfort. Furthermore, such surge pressure may cause collision of the pressure transferring medium with a stopper to shorten life thereof. Particularly, in case of fail-safe mode operation selected in response to failure of the fluid pressure source unit, blocking of fluid communication between the fluid pressure source unit and the pressure control valve so that the supply line is in communication with a drain line incorporating a supply line pressure responsive operational check valve is provided for maintaining the drain pressure at a level higher than a predetermined pressure. the surge pressure caused due to relatively large flow resistance in the drain piping may be fed back to the control line to unnecessarily stiffen the suspension to cause degradation of riding comfort. Furthermore, substantially high surge pressure may serve as a cause of damping of the components of the active suspension system.

SUMMARY OF THE INVENTION

Therefore, it is an object of the present invention to provide a working fluid circuit for an active suspension system, which can avoid the influence of a high pressure surge occuring within a drain path.

In order to achieve the aforementioned and other objects, an active suspension system, according to the present invention, is provided with a pressure accumulator connected to a drain line connecting a drain port of a pressure control valve which controls pressure in the working chamber of an active cylinder. The pressure accumulator serves to absorb a high pressure surge. On the other hand, a surge pressure absorbing means is provided for feeding back the surge pressure generated in the drain line to the pressure accumulator via a supply line so that the surge pressure can be successfully absorbed by the pressure accumulator.

According to one aspect of the invention, an actively controlled suspension system comprises:

a hydraulic cylinder disposed between a vehicle body and a suspension member rotatably supporting a vehicular wheel, said hydraulic cylinder defining therein a working chamber;

a pressure source including a pump associated with an automotive internal combustion engine to be driven by the output of said engine;

a pressure control valve having a first port connected to said working chamber, a second port connected to said pressure source via a supply line and a third port connected to said pressure source via a drain line, said pressure control valve being variable as to valve position for selectively establishing and blocking fluid communication between said first port and said second port and between said first port and said third port for adjusting fluid pressure in said working chamber for controlling suspension characteristics a back pressure absorbing unit, associated with said drain line; for absorbing back pressure in said drain line and a feedback circuit responsive to fluid pressure in said drain line higher than line pressure in said supply line for feeding an excess level of pressure back through said feedback circuit.

The active suspension system further comprise a fail-safe unit which normally connects said pressure source to said pressure control valve via said supply line and is responsive to failure of the active suspension system to establish a closed loop circuit extending through said supply and drain lines by-passing said pressure source for maintaining line pressure at a predetermined level.

The active suspension system may further comprise a check valve disposed in the drain line and connected to the supply line for establishing fluid communication through the drain line when line pressure in the supply line is held higher than or equal to a set pressure. In such case, the back pressure absorbing unit may be provided between the pressure control valve and the check valve. The back pressure absorbing unit may comprise a pressure accumulator. The check valve may comprise a pilot pressure operated operational one-way check valve, which has a pilot chamber to which line pressure in the supply line is introduced for selectively establishing and blocking fluid communication through the drain line. The operational one-way check valve may define an inlet port connected to the pressure control valve via a first section of the drain line and an outlet port connected to a fluid reservoir in the pressure source, the operational one-way check valve further defining a communication path for selectively establishing and blocking fluid communication between the pilot chamber and the inlet port. The operational one-way check valve may include a valve member movable between a first position for establishing fluid communication between the inlet and outlet ports of the check valve and a second position for blocking fluid communication between the inlet and outlet ports of the check valve, and the fluid communication path establishes fluid communication between the pilot chamber and the inlet port when the valve member is in the second position and blocks fluid communication between the pilot chamber and the inlet port when the valve member is in the first position.

The active suspension system may further comprise a control unit associated with at least one sensor for monitoring a preselected vehicle driving parameter, the control unit deriving a control signal for the pressure control valve for operating the latter at a magnitude corresponding thereto, the control unit maintains operation for a given period of time after shutting down of main power supply.

BRIEF DESCRIPTION OF THE DRAWINGS

The present invention will be understood from the detailed description given herebelow and from the accompanying drawings of the preferred embodiments of the invention, which, however, should not be taken as limiting the invention to the specific embodiments, but are for explanation and understanding only.

In the drawings.

DESCRIPTION OF THE PREFERRED EMBODIMENT

Figure 1:
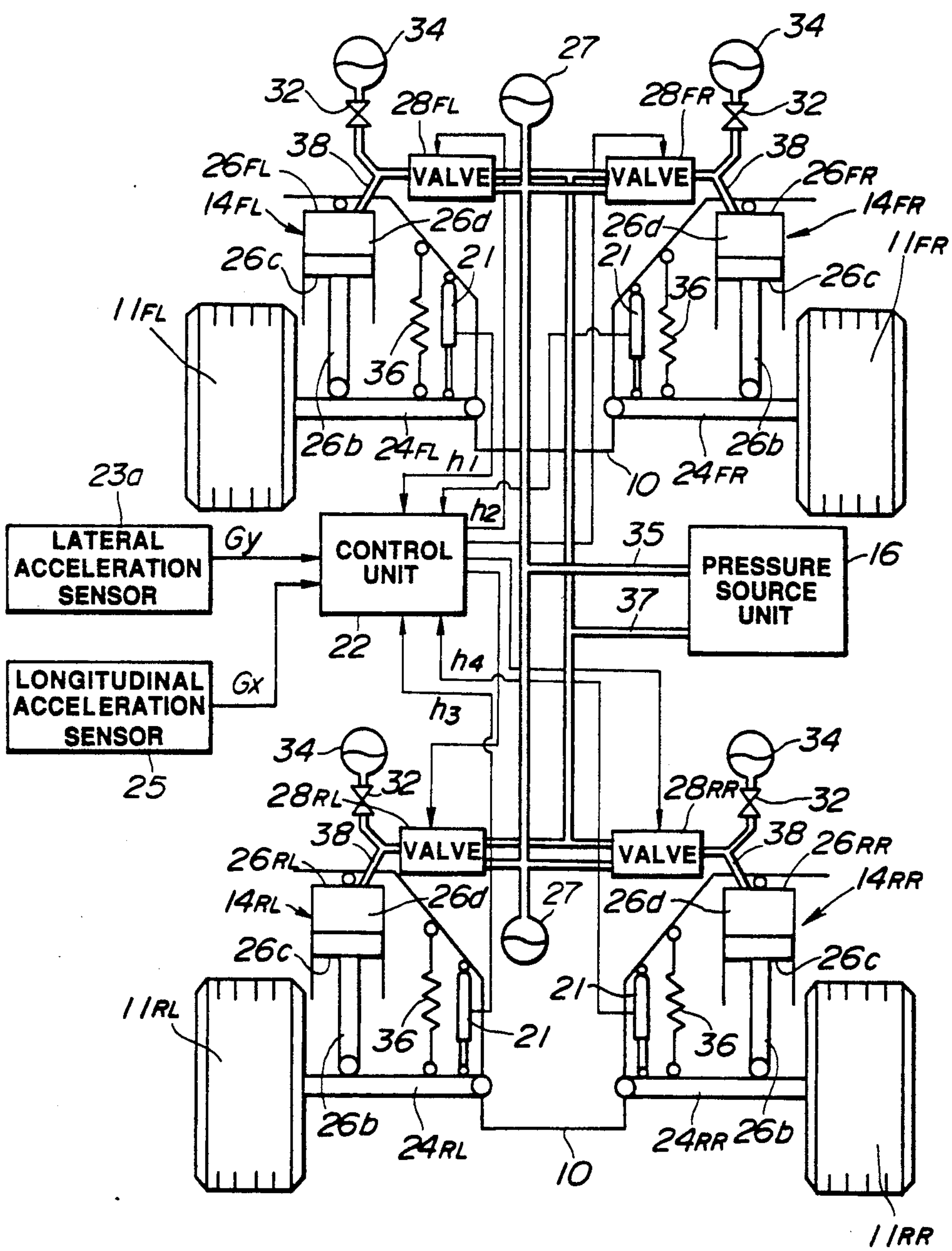
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral 24 as generally referred to. Similarly, the suspension mechanism as generally referred to will be hereafter represented by the reference numeral 14 Respective front-left, front-right, rear-left and rear-right suspension mechanisms 14FL, 14FR, 14RL and 14RR have hydraulic cylinders 26FL, 26FR, 26RL and 26RR which will be represented by the reference numeral 26 as generally referred to.

Each hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body **26*a* defining therein an enclosed chamber. A thrusting piston 26*c* is thrustingly and slidably disposed within the enclosed chamber of the hydraulic cylinder 25 for defining in the latter a working chamber 26*d* and a reference pressure chamber 26*e*. The working chamber 26*d* may communicate with the reference pressure chamber 26*e* via an orifice formed through the piston for fluid communication therebetween in a substantially restrioted amount. The piston 26*c* is connected to the associated one of suspension member 24 via a piston rod 26*b*. A suspension coil spring 36** employed in the type of the suspension system shown is not required. A resilient force of a magnitude required in the ordinary suspension system is the only required resilient force necessary for maintaining the vehicular body about the suspension member.

The working chamber **26*d* of the hydraulic cylinder 26 is connected one of pressure control valves 28FL, 28FR, 28RL and 28RR via a pressure control line 38. The pressure control valves 28FL, 28FR, 28RL and 28RR will be hereafter represented by the reference numeral 28 as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16**.

The pressure control valves 28 comprise, though it is not clearly shown in FIG. 1, electrically or electromagnetically operable actuators (reference is made to FIG. 2), such as proportioning solenoids. The actuators are connected to a microprocessor based control unit 22. The control unit 22 is connected to a plurality of vehicular height sensors 21 which are disposed in respectively associated suspension mechanism and designed for monitoring the relative position of the vehicular body 10 and the relevant suspension member 24 to produce vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls.

While the specific sensors, such as the vehicle height sensors which comprise a stroke sensor, the lateral acceleration sensor 23 and the longitudinal acceleration sensor 25, it is possible to replace or add any other sensor which monitors a vehicle driving parameter associated with the suspension control. For instance, the stroke sensors employed in the shown embodiment shown can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination a vehicular speed data since vehicular speed may influence the rolling magnitude of the vehicle during steering operation.

Figure 2:
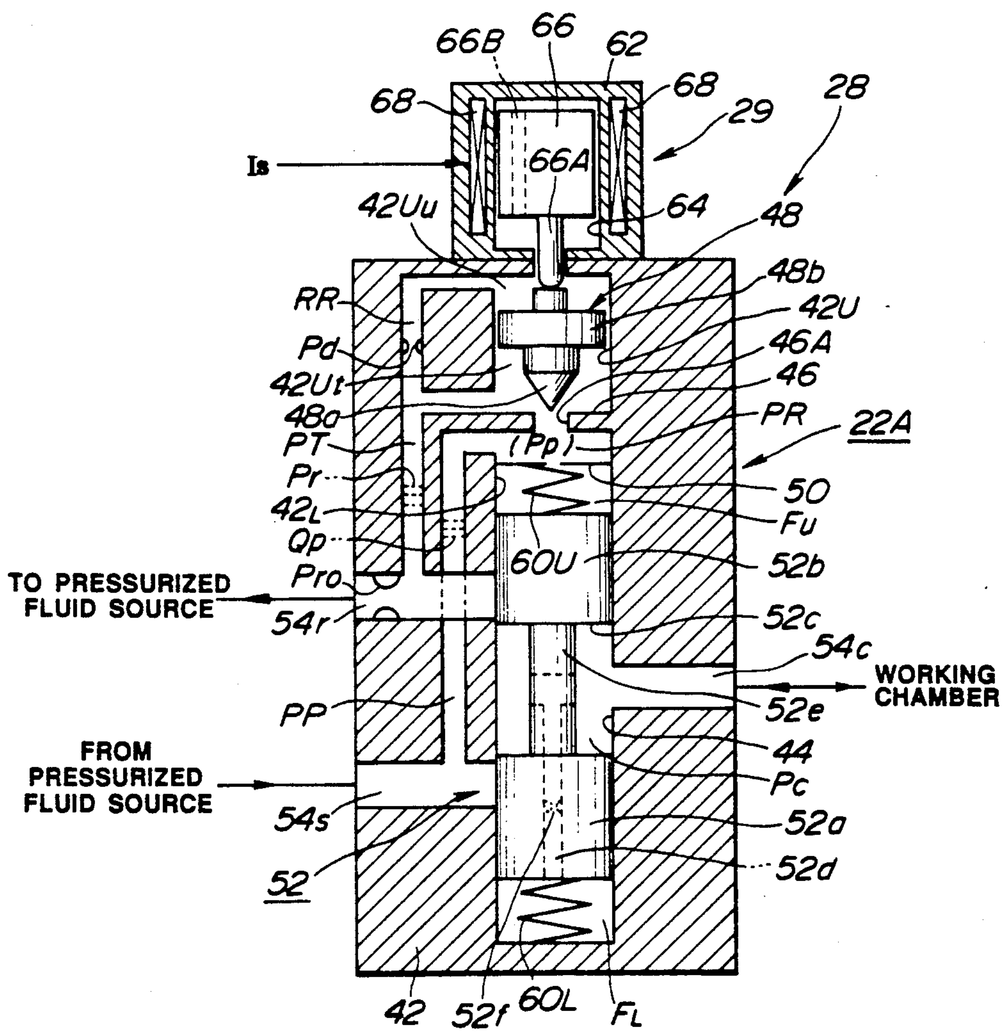
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls fluid pressure magnitude for introduction and draining of pressurized fluid into and from the working chamber 26*d* for adjusting the pressure in the working chamber. As will be appreciated, the adjusted fluid pressure of the working fluid determines the damping force to be created in response to relative displacement between the vehicle body 10 and the suspension member 24. The mode of the suspension mechanism is varied according to variation of the fluid pressure in the working chamber between a predetermined hardest mode a softest mode.

In the construction of the pressure control valve shown in FIG. 2, the pressure control valve 28 includes a valve housing 42. The valve housing 42 defines a valve bore 44 which is separated on to a valve chamber 42L and a control chamber 42U by means of a partioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment with each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between one tip end thereof and the partitioning member 50. The valve spool 52 also defines a lower feedback chamber FL between the other tip end thereof and the bottom of the valve chamber 42L. Offset springs 60U and 50L are disposed within the upper and lower feedback chambers FU and FL, which offset springs epert spring force on the valve spool 52 for resiliently restricting movement of the latter. Resilient forces of the offset springs 60U and 60L are so set as to balance to place the valve spool 52 at a neutral position, when the fluid pressure in the upper and lower feedback chambers FU and FL balance each other. The valve chamber 42L is communicated with a supply line 35 via a supply port 54*s*, a drain line 37 via a drain port 54*r* and a pressure control line 38 via a control port 54*c*, which supply port, drain port and control port are defined in the valve housing 42. The valve spool 52 at the aforementioned neutral position, blocks fluid communication of the pressure control chamber PC with any of the supply port 54*s* and the drain port 54*r*. As a result, as long as the valve spool 52 is maintained at the neutral position, overall fluid force in the hydraulic circuit downstream of the pressure control valve, which circuit includes the working chamber 26*d* of the hydraulic cylinder 26 is held constant.

The valve spool 52 is formed with lands 52*a* and 52*b* connected to each other via smaller diameter bar-like section 52*e*. The land 52*a* is oriented adjacent the lower feedback chamber FL so as to subject the tip end to the fluid pressure in the lower feedback chamber. Similarly, the land 52*b* is oriented adjacent the upper feedback chamber FU so as to subject the tip end to the fluid pressure in the upper feedback chamber. The bar-like section 52*e* between the lands 52*a* and 52*b* is cooperative with the peripheral wall of the valve chamber 42L in order to define therebetween a pressure control chamber PC. A fluid flow path 52*d* is formed through the valve spool 52. The fluid flow path 52*d* has one end communicated with the pressure control chamber PC and the other end communicated with the lower feedback chamber FL. A fixed flow restricting orifice 52*f* is formed in the fluid flow path 52*d* for restricting fluid flow therethrough.

A poppet valve member 48 is disposed within the control chamber 42U for thrusting movement therein. The poppet valve member 48 has a valve head 48*a* of an essentially conical configuration. The valve head 48*a* opposes the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48*a*. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48*b* for separating the control chamber 42U into upper section and lower section 42Uu and 42Ut. The upper and lower sections 42Uu and 42Ut are communicated with the drain port 54*r* via a pilot return path PT. A multi-stage orifice Pr is provided in the pilot return path PT for restricting fluid flow therethrough. The multi-stage orifice Pr comprises a plurality of strips formed with through openings and is so designed that one of the orifices oriented at most upstream side is mainly effective for restricting fluid flow when fluid flowing therethrough a steady flow and that all of the orifices of respective strips are equally effective for restricting fluid flow when fluid flow therethrough is disturbed and not steady. Therefore, as will be appreciated herefrom, the multi-stage orifice Pr employed in the embodiment shown serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54_s_ via a pilot path PP. A multi-stage orifice Qp which has similar construction and flow restricting function to that of the multi-stage orifice Pr is provided in the pilot path PP.

A fixed throttle orifice Pro is also provided in the drain port 54_r_ for restricting fluid flow therethrough. The diameter of the fluid path at the orifice Pro is so selected as to create great flow restriction against pulsatile fluid flow cyclically varying the fluid pressure at a frequency of approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in the longitudinal direction, the influence of the externally applied acceleration can be minimized.

Figure 3:
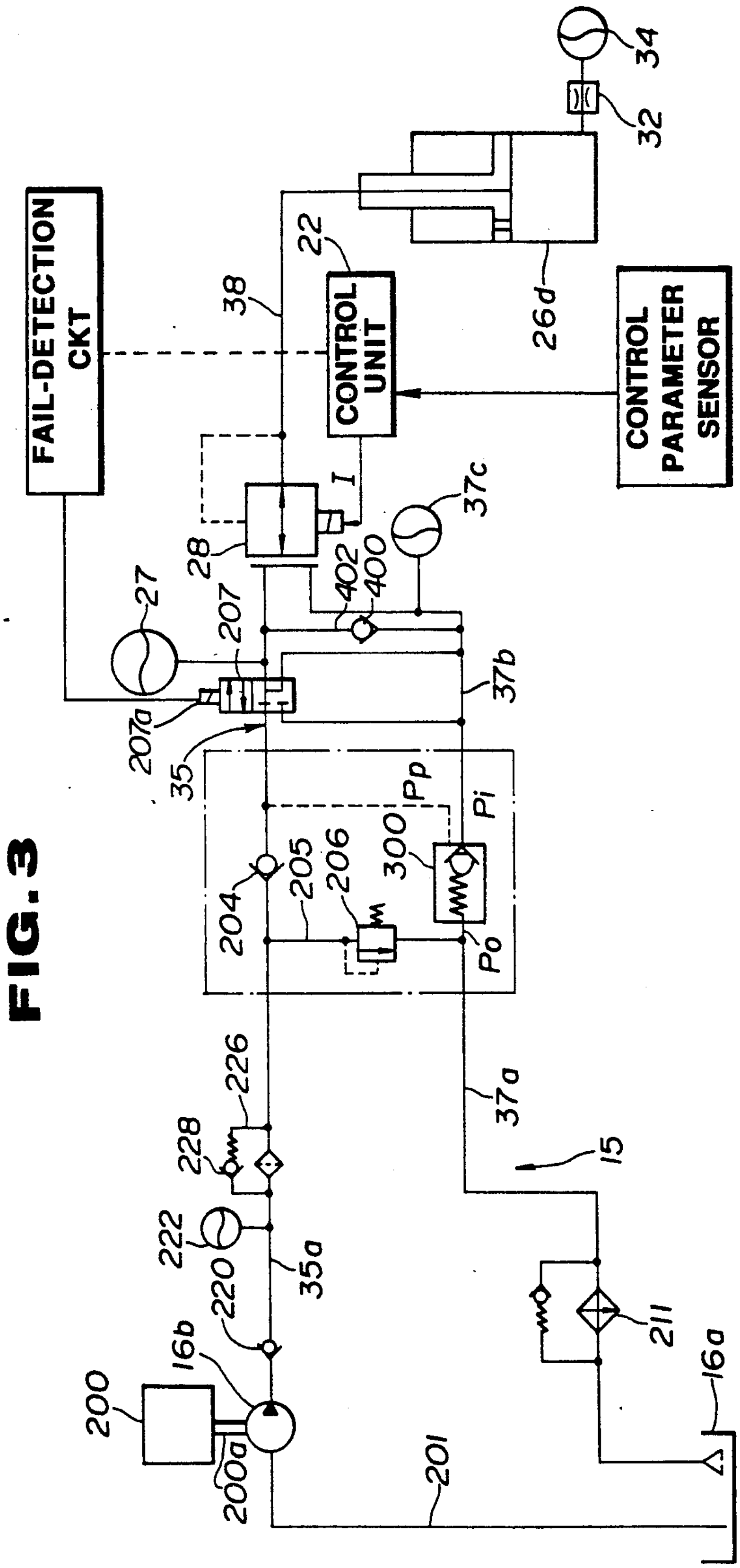
FIG. 3 is a circuit diagram of one example of a hydraulic circuit which is applicable to the active suspension system according to the present invention.

FIG. 3 shows a detailed circuit construction of one example of a hydraulic circuit which is applicable for the embodiment of the active suspension system shown according to the present invention. The hydraulic circuit includes a fluid pressure source circuit 15 which includes the pressure source unit 16. The pressure source unit 16 includes the pressure unit 16_b_ which comprises a fluid pump, and is connected to a fluid reservoir 16_a_ via a suction pipe 201 The fluid pump 16_b_ is associated with an automotive engine 200 so as to be driven by the output torque of the latter output from an engine output shaft 200_a_. The outlet of the pressure unit 16_b_, through which the pressurized working fluid is discharged, is connected to the supply port 54_s_ of the pressure control valve 28 via the supply line 35. An one-way check valve 220, a pressure accumulator 222 for absorbing pulsatile flow, a filter 224 are disposed in a portion 35_a_ of the supply line 35. A by-pass passage 226 with an one-way check valve 228 is provided for by-passing the filter 224.

A pressure accumulator 27 is also connected to the supply line 35 to receive therefrom the pressurized fluid for accumulating the pressure. An one-way check valve 204 is disposed in the supply line 35 at the position upstream of the junction between the pressure accumulator 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to fluid pressure in the supply line 35 higher than a set pressure to drain the excessive pressure to the drain line for maintaining the pressure in the supply line 35 below the given first line pressure level.

On the other hand, an operational one-way check valve 300 is disposed between the sections 37_a_ and 37_b_ of the drain line 37. The operational one-way check valve 300 is also connected to the supply line 35 downstream of the one-way check valve 204 to receive therefrom the pressure in the supply line as a pilot pressure, via a pilot line 208. The operational one-way check valve 300 is designed to be maintained at open position as long as pilot pressure introduced from the supply line 35 at the position downstream of the one-way check valve 204 is held higher than a predetermined pressure. In the open position, the operational one-way check valve maintains fluid communication between the inlet side and outlet side thereof so that the working fluid in the drain line 37 may flow therethrough to the reservoir tank 16_a_. On the other hand, the operational one-way check valve 300 is responsive to the working fluid pressure in the supply line downstream of the one-way check valve 204 serving as the pilot pressure drops below the predetermined pressure level to be switched into a shut-off position. At the shut-off position, the operational one-way check valve 300 blocks fluid communication between the drain port 54_r_ of the pressure control valve 28 and the reservoir tank 16_a_. In the embodiment shown the predetermined pressure is set at a pressure corresponding to the neutral pressure of the pressure control valve unit 28.

A fail-safe valve 207 is provided in the supply line 35. The fail-safe valve 207 is switchable in valve position between a normal mode position, in which the fluid pressure source unit 16 is connected to the inlet port 54_s_ of the pressure control valve 28 via the supply line 35, and a fail-safe mode position, in which fluid communication between fluid source unit and the pressure control valve is blocked and the fluid communication between the drain line 37 and the inlet port of the pressure control valve is established. For switching the valve position between the normal mode position and the fail-safe mode position, an electromagnetic solenoid 207_a_ is provided.

A manner of detecting failure of the active control system has been disclosed in the co-pending U.S. patent application filed on Apr. 20, 1990, and entitled Fail Detecting System for Electromagnetic Actuator and Fail-Safe System for Active Suspension System Incorporating Electromagnetic Actuator, for example. The disclosure of the above-identified co-pending U.S. patent application is herein incorporated by reference for the sake of disclosure.

For section 37_b_ of the drain line 37, a pressure accumulator 37_c_ is provided. The pressure accumulator 37_c_ is arranged for absorbing a high pressure surge generated by flow resistance in the drain line 37. On the other hand, a feedback line 402 is provided for directly connecting the drain line 37 and the supply line 35 via an one-way check valve 400. The one-way check valve 400 is adapted to permit fluid flow from the drain line 37 to the supply line and blocks the fluid flow in the opposite direction.

With presence of the feedback line 402 with the one-way check valve 400, the excess level of surge pressure generated in the drain line can be fed back to the supply line 35 when the pressure level in the drain line becomes higher than the line pressure in the supply line. The excess pressure supplied to the supply line 35 can be absorbed by the pressure accumulator 27 which is connected to the supply line in the vicinity of the junction between the supply line and the feedback line. As a result, the back pressure or surge pressure level in the drain line can be adjusted to be lower than or equal to the line pressure in the supply line.

An oil cooler 211 is disposed in the drain line 37 for cooling the working fluid returning to the reservoir tank 16_a_.

Figure 5:
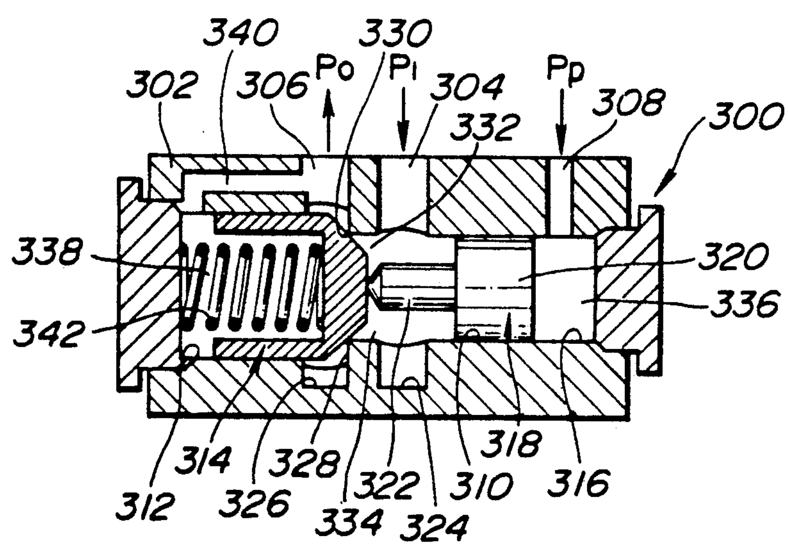
FIG. 5 is a sectional view of an operational one-way check valve employed in the preferred embodiment of the hydraulic circuit of the active suspension system of the invention.
Figure 6A:
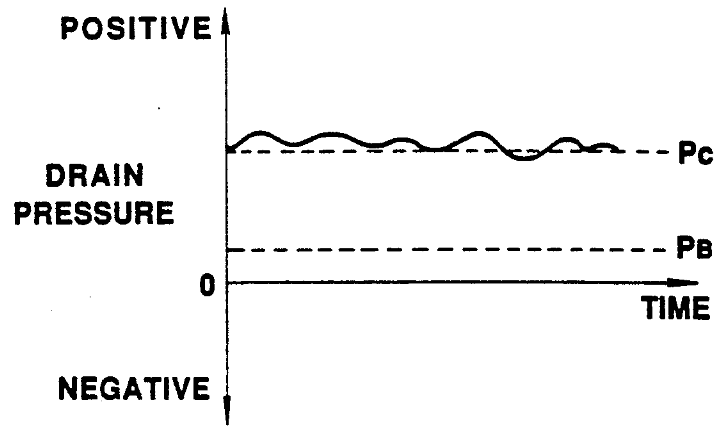
FIG. 6 is a chart showing the influence of back pressure in a drain line for variation of fluid pressure in a working chamber of a hydraulic cylinder in the preferred embodiment of the active suspension system.
Figure 6B:
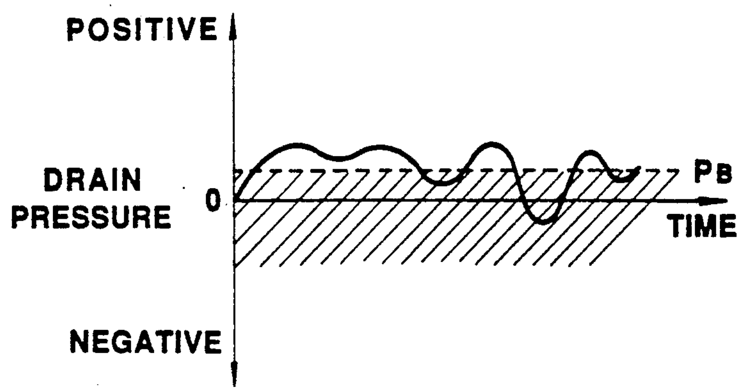
Figure 6C:
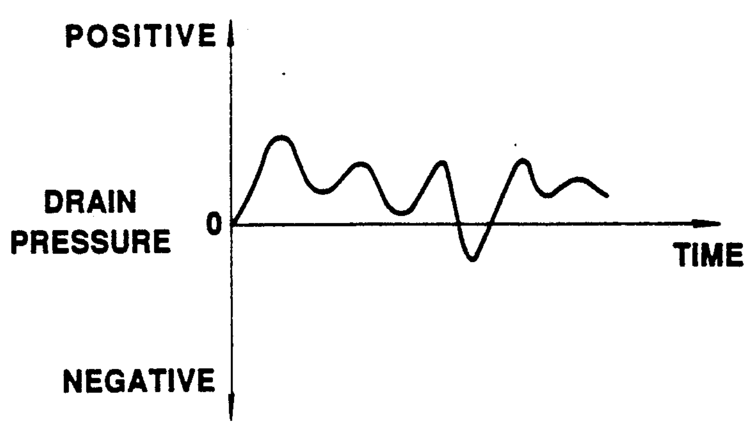

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section 35*a* disposed between the one-way check valve 204 and the pressure control valve unit 28FL 28FR, 28RL and 28RR, via the pilot line 300*a*. The pilot port 308 is, on the other hand, communicated with the smaller diameter section 316 to supply the line pressure of the supply line 35 at a position downstream of the one-way check valve 204 as the pilot pressure Pp. On the other hand, the inlet port 304 is communicated with the drain port 54*r* of the pressure control valve unit 28 via a section 37*b* of the drain line 37. The inlet port 304 communicates with the smaller diameter section 316 via an annular groove 324 formed on the inner periphery of the valve housing 302. The outlet port 306 is communicated with the fluid reservoir 16*a* via a section 37*a* of the drain line 37 and, in turn, is communicated with the larger diameter section 312 via an annular groove 326 formed on the inner periphery of the valve housing 302. As seen from FIG. 5, the annular grooves 324 and 326 are oriented in side-by-side relationship leaving a radially and inwardly projecting land 328. The land 328 has a shoulder 330.

The valve spool 318 and the poppet valve 314 and cooperate with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting spring force on the poppet valve 314. In the preferred embodiment, the set spring 342 is provided a set force which corresponds to the neutral pressure $P_N$ of the pressure control valve unit 28.

The valve spool 318 has a valve body 320 and a valve stem 322 projecting from the valve body toward the poppet valve 314. The tip end of the valve stem 322 contacts the mating surface of the poppet valve 314. The poppet valve 314 has an annular shoulder 332 mating with the shoulder of the land 330.

With the construction set forth above, the operational one-way check valve 300 operates as both the pressure relief valve for relieving the excessive pressure in the drain line and one-way check valve. The relief pressure for the poppet valve 314 can be illustrated by the following balancing equation:

$$F_0 = P_{p0} \times A$$

where $F_0$ is the set pressure of the set spring 342

A is an effective area of the spool and $P_{p0}$ is a relief pressure.

Here, assuming that the pressure Pi at the inlet port 304 is greater than or equal to the pilot pressure Pp at the pilot chamber 336, the valve spool 318 is shifted away from the poppet valve 314 so that the pilot pressure Pp in the pilot chamber 336 is not active on the valve position of the poppet valve. In such a case, the poppet valve 314, operates purely as the pressure relief valve for relieving excessive pressure. At this time, the force balance is illustrated by:

$$Pi \times A = P_{p0} \times A.$$

Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section 37*a* of the drain line 37 to the fluid reservior 16*a*. On the other hand, when the pressure at the inlet port 304 is lower than or equal to the relief pressure $P_{p0}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(P_p - Pi) \times A$. At this time, the pressure Pi introduced into the control chamber 334 via the inlet port 304 is canceled as an internal pressure. Therefore, the pressure balance at the poppet valve 314 can be illustrated by:

$$F_0 + kx = P_p \times A$$

where k is a spring coefficient of the set spring 342 and x is a stroke of the poppet valve 314.

From the balancing equations given hereabove, the operational check valve 300 becomes open when the pilot pressure $P_p$ is higher than the relief pressure $P_{p0}$ and is held at a shut-off position while the pilot pressure is held lower than the relief pressure.

In the hydraulic circuit set forth above, the fluid pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54*s* and the pressure control port 54*c* from the valve position shown in FIG. 2, the pressurized working fluid passes the pressure control valve 28 and is introduced into the working chamber 26*d* of the hydraulic cylinder 26. On the other hand, when the pressure control valve 28 is shifted to block fluid communication between the supply port 54*s* and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus fluid is returned to the reservoir tank 16*a*.

The fluid pressure in the supply line 35 is also fed to the operational one-way check valve 300 via a pilot line 208. As set forth, the operational one-way check valve 300 is placed at open position as long as the pilot pressure introduced through the pilot line 300*a* is held higher than or equal to the set pressure thereof. Therefore, fluid communication between the pressure control valve 28 and the reservoir tank 16*a* is maintained. At this position, the working fluid is thus returned to the reservoir tank 16*a* via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_0$. Then, the pressure relief valve 209 becomes active to open to allow relief of the excessive pressure of the working fluid to flow through the by-pass line 210.

When the engine stops, the pressure unit 16 ceases operation. On stopping the pressure unit 16, the working fluid pressure in the supply line 35 drops. According to the drop of the pressure in the supply line 35, the pilot pressure to be exerted on the operational one-way check valve 300 via the pilot line 300*a* drops. When the pressure in the pilot line 300*a* drops below or equal to the set pressure, the operational one-way check valve 300 is switched into an operational one-way check position to block fluid communication therethrough. As a result, the fluid pressure in the drain line 37 upstream of the operational one-way check valve 300 becomes equal to the pressure in the working chamber 26*d*. Therefore, even when the working fluid leaks through a gap between the spool valve 52 and the inner periphery of the valve bore, it does not affect the fluid pressure in the working chamber.

Figure 4:
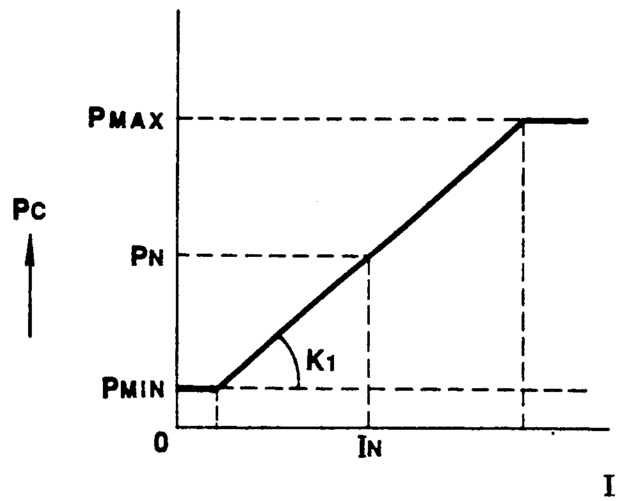
FIG. 4 is a chart showing the relationship between an electric current value of a control signal to be supplied for an actuator of the pressure control valve and working fluid pressure supplied to a working chamber of a hydraulic cylinder.

FIG. 4 shows variation of the working fluid pressure in the working chamber 26*d* of the hydraulic cylinder 26 according to variation of the current value of the control signal applied to the actuator 29 of the pressure control valve 28. As seen from FIG. 4, the hydraulic pressure in the working chamber 26*d* varies between a maximum pressure $P_{max}$ which is saturation pressure of the pressure source unit 16 and a minimum pressure $P_{min}$ which is set at a certain magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level labeled $P_N$ represents neutral pressure at the neutral current $I_N$. As seen, the neutral current $I_N$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized to a magnitude corresponding the neutral value $I_N$ of the control signal to place the poppet valve 48 at the corresponding position. At this position, the flow resistance at the communication path opening 46A, the path area of which is restricted by the valve head 48*a* of the poppet valve 48 becomes the neutral value. At this position of the poppet valve 48, the pilot pressure $P_p$ within the pilot chamber PR is maintained at the neutral pressure $P_N$. At this condition, if the fluid pressure of the control pressure Pc in the pressure control port 54*c* is held equal to the fluid pressure in the working chamber 26*d* of the hydraulic cylinder 26, the fluid pressure in the upper and lower feedback chambers FU and FL are held in balance to each other. The valve spool 52 is maintained at the neutral position to shut off fluid communication between the supply port 54*s*, the drain port 54*r* and the pressure control port 54*c*. Therefore, the control pressure Pc is maintained at the neutral pressure $P_N$.

At this condition, when relatively high frequency and small magnitude road shock input through the vehicular wheel, it is absorbed by fluid communication between the working chamber 26*d* and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26*c* strokes in a rebounding direction compressing the fluid in the working chamber 26*d*, the fluid pressure in the working chamber increases to increase the control pressure Pc in the pressure control port 54*c*. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54*r* and the pressure control port 54*c*. Therefore, the pressure in the pressure control port 54*c* is drained through the drain line 37. This causes a pressure drop at the pressure control port 54*c* so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54*s* and the pressure control port 54*c*. The pressurized working fluid in the supply line 35 is thus supplied to the working chamber 26*d* via the pressure control port 54*c* to increase the fluid pressure. By repeating the foregoing cycles, pressure balance is established between the pressure control port 54*c* and the pilot chamber PR. Therefore, the control pressure Pc as well as the fluid pressure in the working chamber 26*d* are adjusted to the pilot pressure.

During the pressure adjusting operation set forth above, the fixed throttling orifice Pro serves to restrict fluid flow from the pressure control port 54*c* to the drain line 37. This flow restriction at the orifice Pro serves as resistance against the rebounding stroke of the piston 26*c* to damp or absorb energy causing rebounding motion of the vehicle body. Furthermore, as set out, working fluid in the pilot chamber PR is generally introduced through the pilot path pp via the multi-stage orifice Qp and returned through the pilot return path PT via the lower section 42Ut of the control chamber 42U and via the multi-stage orifice Pr. As long as the fluid flow in the pilot return path PT is not disturbed and thus steady. The most upstream side orifice Pr' is mainly effective for restricting the fluid flow. Therefore, the magnitude of flow restriction is relatively small so as to provide sufficient response characteristics for reduction of the pilot pressure. On the other hand, when the working fluid flowing from the control chamber 42U is in confluence with the working fluid from the pilot chamber PR, back pressure is produced in the drain port 54*r*, and the fluid flowing through the pilot return path PT is disturbed and thus becomes unstable. This tends to cause transfer of the pressurized fluid from the drain port 54*r* to the pilot chamber PR. In such a case, all of the orifices in the multi-stage orifice Pr are effective to create greater flow restriction than that for the steady flow. This avoids the influence of the back pressure created in the drain port 54*r*.

Similarly, in response to the bounding stroke of the piston 26*c*, the valve spool 52 is shifted up and down to absorb bounding energy and maintains the fluid pressure in the working chamber 26*d* of the hydraulic cylinder 26 at the neutral pressure.

On the other hand, when the anti-rolling suspension control takes place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26*d* of the hydraulic cylinder 26 which is provided for the suspension mechanism at the side where the vehicular height is lowered across the neutral position, is increased to suppress lowering motion of the vehicle body. On the other hand, the fluid pressure in the working chamber 26*d* of the hydraulic cylinder 26 which is provided for the suspension mechanism at the side where the vehicular height has risen across the neutral position, is decreased to suppress rising motion of the vehicle body. Therefore, in order to control the pressures in the working chambers 26*d* of the side hydraulic cylinders 26, control signal current values are increased and decreased across the neutral value $I_N$.

For example, when rolling motion is caused by a left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, the flow restriction magnitude at respective communication path openings 46A is varied to vary the pilot pressures Pp in the pilot chamber PR. As set forth, since the fluid pressures in the working chambers 26*d* become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 7:
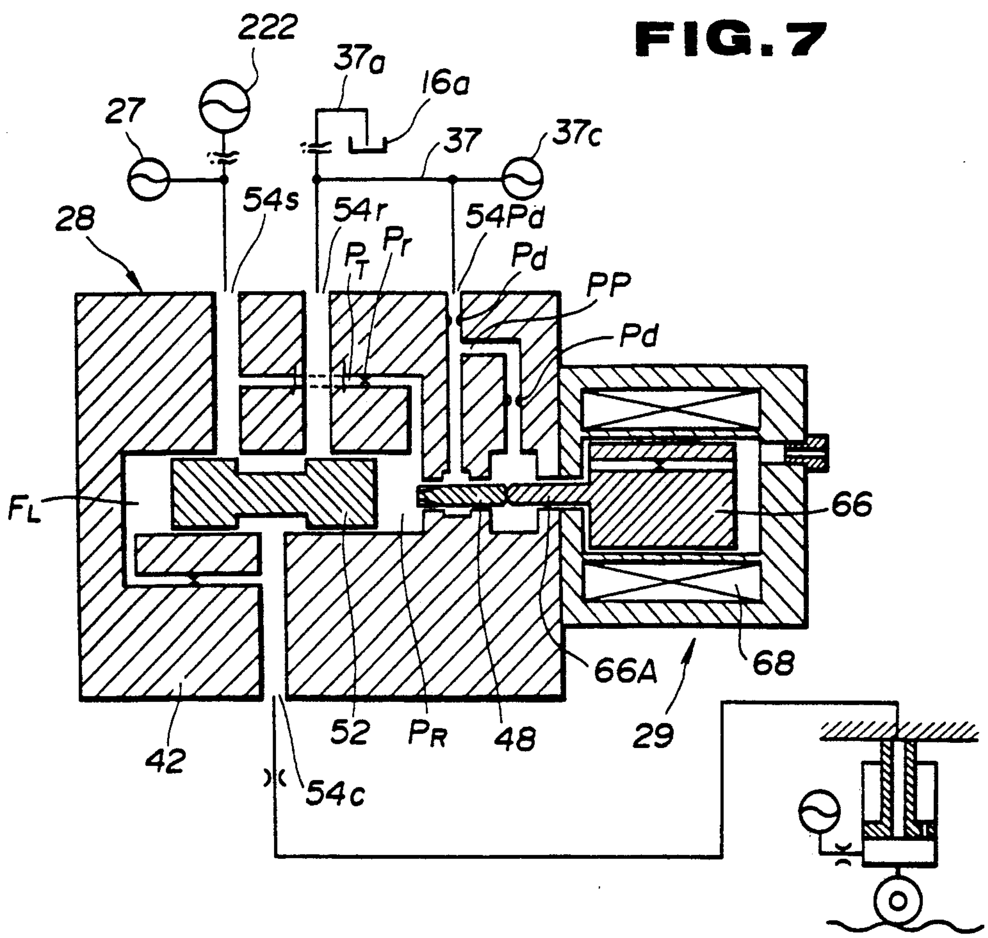
FIG. 7 is a section of a modified embodiment of the pressure control valve unit to be employed in the preferred embodiment of the active suspension system of FIG. 1.

FIG. 7 shows a modification of the pressure control valve unit 28 employed in the active suspension system according to the present invention. In this modification, the pilot path PP is connected to a path connecting the pressure accumulator 37*c* to the drain line 37 via a pilot drain port 54*pd* which has a flow restriction orifice Ppd. With this construction, substantially the same back pressure absorption can be obtained.

Figure 8:
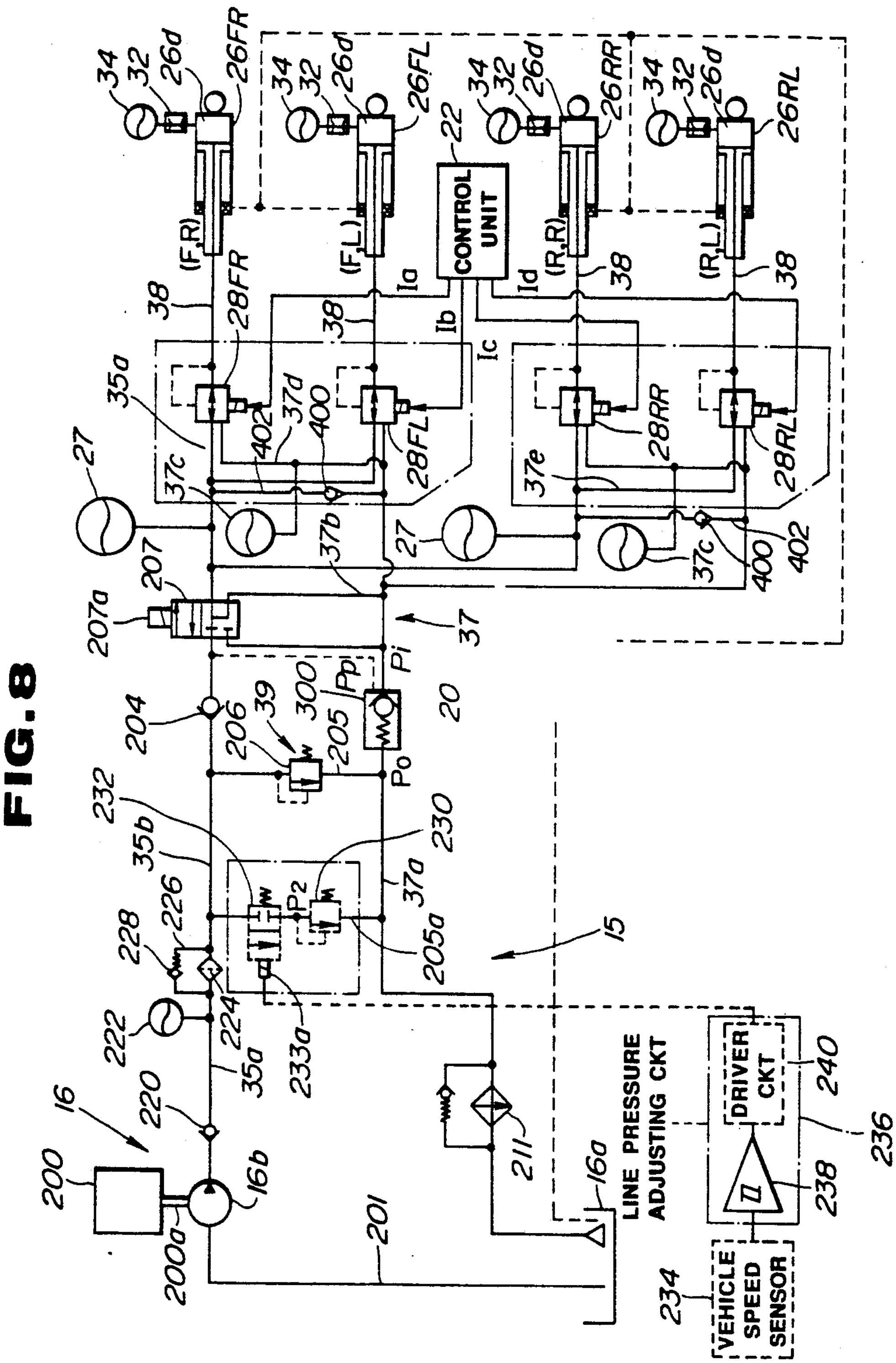
FIG. 8 is a circuit diagram of a modified hydraulic circuit in the active suspension system.

FIG. 8 shows a modification of the hydraulic circuit which is also applicable for the embodiment of the active suspension system shown, according to the present invention. Similarly to the foregoing circuit in FIG. 3, the hydraulic circuit includes a fluid pressure source circuit 15 which includes the pressure source unit 16. The pressure source unit 16 includes the pressure unit 16*b* which comprises a fluid pump, and is connected to a fluid reservoir 16*a* via a suction pipe 201. The fluid pump 16*b* is associated with an automotive engine 200 so as to be driven by the output torque of the latter output from an engine output shaft 200*a*. The outlet of the pressure unit 16*b*, through which the pressurized working fluid is discharged, is connected to the supply ports 54*s* of the pressure control valves 28FL, 28FR, 28RL and 28RR respectively associated with the hydraulic cylinders 26FL, 26FR, 26RL and 26RR, via the supply line 35. An one-way check valve 220, a pressure accumulator 222 for absorbing pulsatile, a filter 224 are disposed in a portion 35*b* of the supply line 35. A by-pass passage 226 with an one-way check valve 228 is provided for by-passing the filter 224. The supply line 35 has branch lines 35*a* respectively connected to the supply ports 54*s* of respectively corresponding pressure control valves 28FL, 28FR, 28RL and 28RR.

High pressure accumulators 27 are also connected to the supply line 35 to receive therefrom the pressurized fluid for accumulating the pressure, which accumulators have large capacity and a high set pressure, e.g. several tens kg/cm$^2$. An one-way check valve 204 is disposed in the supply line 35 at the position upstream of the junction between the high pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

It should be noted that if desired, line pressure can be adjusted depending upon a preselected vehicle driving parameter such as a vehicle speed. In case vehicle speed dependent variable line pressure is desired, another pressure relief valve 230 may be provided in parallel to the pressure relief valve 206 as shown by a broken line in FIG. 8. The pressure relief valve 230 is disposed in an additional pressure relief line 205*a* which extends parallel to the pressure relief line 205 and is thus connected to the section 35*a* of the supply line 35 in the fluid pressure source circuit 15 at the upstream end and to the section 37*a* of the drain line 37 in the fluid pressure source circuit at the downstream end. An electromagnetic shut-off valve 232 is also provided in the pressure relief line 205*a* at a position upstream of the pressure relief valve 230. The pressure relief valve 205*a* is provided a lower set pressure than that of the pressure relief valve 206 so as to adjust the line pressure in the supply line 35 at a second line pressure level which is lower than the first line pressure level.

The electromagnetic shut-off valve 232 has an electromagnetic solenoid 232a connected to a line pressure adjusting circuit 236 so that it may be operated in response to a line pressure control signal from the latter to switch the valve position between an open position to establish fluid communication between the supply line 35 and the pressure relief valve 230 and a closed position to block fluid communication therebetween. The line pressure adjusting circuit 236 comprises a Schmitt trigger circuit 238 and a driver circuit 240. The Schmitt trigger circuit 238 is connected to a vehicle speed sensor 234 which monitors vehicle speed to produce a vehicle traveling speed to produce a vehicle speed indicative signal V. The Schmitt trigger circuit 238 is designed to respond to a vehicle speed indicative signal value greater than a preset speed to output a HIGH level signal and output a LOW level signal otherwise. The driver circuit 240 is so designed as to output driver current to the solenoid 232a of the electromagnetic shut-off valve 232 for energizing the solenoid to place the shut-off valve at an open position when the output of the Schmitt trigger circuit 238 is held at a LOW level. The preset speed of the Schmitt trigger circuit 238 represents substantially low vehicle speed where adjustment of the fluid pressure in the working chamber 26d of the hydraulic cylinder 26 is not required.

Therefore, while the vehicle is not running or is traveling at a substantially low speed lower than the set speed, the pressure relieve valve 230 becomes active to relief the pressure in excess of the second relief pressure. Therefore, the line pressure in the supply line 35 is lowered to reduce the load on the engine for driving the fluid pump 16a.

On the other hand, an operational one-way check valve 300 is disposed between sections 37a and 37b of the drain line 37. The section 37b of the drain line 37 forms two branches. As can be seen from FIG. 7, the drain ports 54r of the pressure control valves 28FL and 28FR are connected to one branch of the section 37b via a communication line 37d. For the communication line 37d, a low pressure accumulator 37c which has smaller capacity than the accumulator 27 and a lower set pressure, e.g. several kg/cm$^2$, is connected. On the other hand, the drain ports 54r of the pressure control valves 28RL and 28RR are connected to one of the branch of the section 37b via a communication line 37e. For the communication line 37e, a low pressure accumulator 37c is connected. The operational one-way check valve 300 is also connected to the supply line 35 downstream of the one-way check valve 204 to receive therefrom the pressure in the supply line as a pilot pressure, via a pilot line 208. The operational one-way check valve 300 is designed to be maintained at an open position as long as pilot pressure introduced from the supply line 35 at the position downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure drops below the predetermined pressure level to be switched into a shut-off position. At the shut-off position, the operational one-way check valve 300 blocks fluid communication between the drain port 54r of the pressure control valve 28 and the reservoir tank 16a. In the embodiment shown, the predetermined pressure is set at a pressure corresponding to the neutral pressure of the pressure control valve unit 28.

As can be seen, in the modification shown, the pressure relief valve 400 is provided in the drain line at a position upstream of the operational one-way check valve 300. Even at the position shown, substantially the equivalent low pressure surge suppressive effect to be achieved by the former embodiment can be successfully achieved.

An oil cooler 211 is disposed in the drain line 37 for cooling the working fluid returning to the reservoir tank 16a.

In the construction shown, piping for the drain line can be simplified by commonly using the sections 37b. Also, by providing the low pressure accumulator in the communication lines 37d and 37e, back pressure in the drain line can be successfully absorbed. Also, the pressure accumulators 37c are also active for absorbing interfering pressure between two pressure control valves commonly connected to single drain line 37b.

With the construction set forth above, the feedback line 402 incorporating the one-way check valve 400 serves for feeding the excess level of pressure higher than the line pressure, back to the supply line for avoiding the influence of the surge pressure generated in the feedback line..

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, the active suspension system can be constructed in various types and control of the active suspension can be done in various ways. For example, reference is mode to the following co-pending applications, publication and patents.

U.S. patent application Ser. No. 052,934, filed on May 22, 1989, which has now been issued as U.S. Pat. No. 4,903,983, on Feb. 27, 1990.

U.S. patent application Ser. No. 059,888, filed on Jun. 9, 1987, now abandoned, corresponding European Patent Application has been published as First Publication No. 02 49 209:

U.S. patent application Ser. No. 060,856, filed on Jun. 12, 1987, now abandoned, corresponding European Patent Application has been published as First Publication No. 02 49 227:

U.S. patent application Ser. No. 060,909, filed on Jun. 12, 1987 now U.S. Pat. No. 4,909,534 issued on Mar. 20, 1990:

U.S. patent application Ser. No. 060,911, filed on Jun. 12, 1987, which has now been issued as U.S. Pat. No. 4,801,155, on Jan. 31, 1989:

U.S. patent application Ser. No. 176,246, filed on Mar. 31, 1988, now U.S. Pat. No. 4,888,696 issued on Dec. 19, 1989, the corresponding European Patent Application has been published as First Publication No. 02 85 153:

U.S. patent application Ser. No. 178,066, filed on Apr. 5, 1988, which has now been issued as U.S. Pat. No. 4,848,790, on Jul. 18, 1989, and the corresponding European Patent Application has been published as First Publication No. 02 86 072:

U.S. patent application Ser. No. 167,835, filed on Mar. 4, 1988, which has now been issued as U.S. Pat. No. 4,865,348, on Sep. 12, 1989:

U.S. patent application Ser. No. 244,008, filed on Sep. 14, 1988 now U.S. Pat. No. 4,938,499 issued on Jul. 3, 1990:

U.S. patent application Ser. No. 255,560, filed on Oct. 11, 1988 now U.S. Pat. No. 4,943,084 issued on Jul. 24, 1990:

U.S. patent application Ser. No. 266,763, filed on Nov. 3, 1988 now U.S. Pat. No. 4,967,360 issued on Oct. 30, 1990, corresponding European Patent Application has been published under First Publication No. 03 18 721:

U.S. patent application Ser. No. 261,870, filed on Oct. 25, 1988 now U.S. Pat. No. 5,041,977 issued on Aug. 20, 1991:

U.S. patent application Ser. No. 263,764, filed on Oct. 28, 1988 now U.S. Pat. No. 4,905,152 issued on Feb. 27, 1990, corresponding European Patent Application has been published under First Publication No. 03 14 164:

U.S. patent application Ser. No. 277,376, filed on Nov. 29, 1988 now U.S. Pat. No. 4,919,440 issued on Apr. 24, 1990, corresponding European Patent Application has been published under First Publication No. 03 18 932:

U.S. patent application Ser. No. 303,338, filed on Jan. 26, 1989 now U.S. Pat. No. 5,013,061 issued on May 7, 1991, corresponding German Patent Application has been published under First Publication No. 39 02 312:

U.S. patent application Ser. No. 302,252, filed on Jan. 27, 1989 now U.S. Pat. No. 5,042,832 issued on Aug. 27, 1991:

U.S. patent application Ser. No. 310,130, filed on Mar. 22, 1989 now U.S. Pat. No. 4,973,079 issued on Nov. 27, 1990, corresponding German Patent Application has been published under First Publication No. 39 04 922:

U.S. patent application Ser. No. 327,460, filed on Mar. 22, 1989 now U.S. Pat. No. 4,911,469 issued on Mar. 27, 1990, corresponding German Patent Application has been published under First Publication No. 39 10 030:

U.S. patent application Ser. No. 303,339, filed on Jan. 26, 1989 now U.S. Pat. No. 4,948,165 issued on Aug. 14, 1990:

U.S. patent application Ser. No. 331,602, filed on Mar. 31, 1989 now U.S. Pat. No. 4,911,468 issued on Mar. 27, 1990:

U.S. patent application Ser. No. 331,653, filed Mar. 31, 1989 now U.S. Pat. No. 4,911,470 issued on Mar. 27, 1990, corresponding German Patent Application has been published under First Publication No. 39 10 445:

U.S. patent application Ser. No. 364,477, filed on Jun. 12, 1989 now U.S. Pat. No. 5,087,068 issued on Feb. 11, 1992, corresponding European Patent Application has been published under First Publication No. 03 45 816:

U.S. patent application Ser. No. 365,468, filed on Jun. 12, 1989, corresponding European Patent Application has been published under First Publication No. 03 45 817:

U.S. patent application Ser. No. 422,813, filed on Oct. 18, 1989 now U.S. Pat. No. 4,961,595 issued on Oct. 9, 1990:

U.S. patent application Ser. No. 454,785, filed on Dec. 26, 1989 now U.S. Pat. No. 4,982,979 issued on Jan. 8, 1991.

The disclosures of the hereabove listed prior applications, publications and patents are herein incorporated by reference. Furthermore, any two or more prior proposed inventions may be combined in a practical implementation of an active suspension system. Therefore, any combination of the above mentioned prior proposed inventions are to be deemed as disclosed due to incorporation by reference as a part of the present invention.

What is claimed is:

1. An actively controlled, vehicular wheel suspension system, comprising:

a hydraulic, vehicular wheel suspension cylinder;

a hydraulic supply line coupled to a hydraulic pressure source;

a hydraulic return line coupled to a hydraulic reservoir;

a pressure control valve, coupled to said supply line, said return line and said hydraulic cylinder, for controlling hydraulic pressure in said hydraulic cylinder;

a fail-safe valve, coupled in said supply line, for providing a normal hydraulic path to said pressure control valve and, responsive to failure of said suspension system, for blocking said normal hydraulic path and establishing an alternate hydraulic path from said pressure control valve to said return line;

a feedback valve, coupled across said return line and said supply line between said pressure control valve and said fail-safe valve, for responding to excess hydraulic pressure in said return line relative to hydraulic pressure in said supply line and for providing a feedback path from said return line to said supply line for said excess hydraulic pressure; and a back pressure absorber, coupled to said supply line between said pressure control valve and said fail-safe valve, for absorbing said excess hydraulic pressure fed back over said feedback path from said return line to said supply line.

2. A system as in claim 1, wherein:

said feedback valve comprise a check valve connected across said supply line and said return line in a direction to normally prevent backflow from said return line to said supply line and connected adjacent said pressure control valve to relieve said excess hydraulic pressure;

said back pressure absorber comprises a pressure accumulator; and said pressure control valve, due to pressure variation therein, causes said excess hydraulic pressure in said return line.

3. An actively controlled, vehicular wheel suspension system, comprising:

a hydraulic suspension cylinder;

hydraulic pressure source means;

a hydraulic supply line coupled to said hydraulic pressure source means;

a hydraulic return line coupled to a hydraulic reservoir;

pressure control valve means for adjusting hydraulic pressure in said hydraulic cylinder, said pressure control valve means including a first port coupled to said hydraulic cylinder, a second port coupled to said supply line and a third port coupled to said return line;

fail-safe means located in said hydraulic supply line for providing a normal hydraulic path through said hydraulic supply line to said second port and responsive to failure of said suspension system for blocking said normal hydraulic path and for establishing a hydraulic path between said second port and said return line;

feedback means, coupled to said return line and coupled to said supply line between said fail-safe means and said pressure control valve means and responsive to excess hydraulic pressure in said return line relative to said supply line, for providing a feedback path for said excess hydraulic pressure from said return line to said supply line; and back pressure absorbing means, coupled to said supply line between said fail-safe means and said pressure control valve means, for absorbing said excess pressure fed back to said supply line over said feedback path from said return line.

4. A system as in claim 3, wherein:

said feedback means comprises a check valve connected across said supply line and said return line in a direction to normally prevent backflow from return line to said supply line.

5. A system as in claim 4, wherein:

said check valve is connected adjacent to said pressure control valve means; and said pressure control valve means feeds said excess hydraulic pressure to said return line due to pressure variation occurring in said pressure control valve means.

* * * * *

UNITED STATES PATENT AND TRADEMARK OFFICE

CERTIFICATE OF CORRECTION

PATENT NO. : 5,156,645

DATED : October 20, 1992

INVENTOR(S) : Masahiro TSUKAMOTO et al.

It is certified that error appears in the above-indentified patent and that said Letters Patent is hereby corrected as shown below:

On the title page, item (73) Assignee:

"NISSON" should read --NISSAN-- and insert --KAYABA KOGYO KABUSHIKI KAISHA--.

Signed and Sealed this

Eleventh Day of October, 1994

*Attest:*

BRUCE LEHMAN

*Attesting Officer*

*Commissioner of Patents and Trademarks*